March 2, 1965 E. H. PAUFVE ETAL 3,172,046

SIGNAL FILTER SYSTEM

Filed April 9, 1962 9 Sheets-Sheet 1

ELDRED H. PAUFVE
JOHN M. HUNT
INVENTOR

BY Richard D. Stephens
ATTORNEY

ELDRED H. PAUFVE & JOHN M. HUNT
INVENTOR

BY Richard G. Stephens
ATTORNEY

ELDRED H. PAUFVE
& JOHN M. HUNT
INVENTOR

BY Richard G. Stephens
ATTORNEY

ELDRED H. PAUFVE & JOHN M. HUNT
INVENTOR

BY Richard G. Stephens
ATTORNEY

ELDRED H. PAUFVE
&
JOHN M. HUNT
INVENTOR

BY Richard D. Stephens
ATTORNEY

March 2, 1965

E. H. PAUFVE ETAl 3,172,046

SIGNAL FILTER SYSTEM

Filed April 9, 1962

9 Sheets-Sheet 6

ELDRED H. PAUFVE & JOHN M. HUNT

INVENTOR

BY Richard L. Stephens

ATTORNEY

SIGNAL FILTER SYSTEM

Filed April 9, 1962 9 Sheets-Sheet 7

ELDRED H. PAUFVE
JOHN M. HUNT
INVENTOR

BY Richard G. Stephens
ATTORNEY

March 2, 1965 E. H. PAUFVE ETAL 3,172,046

SIGNAL FILTER SYSTEM

Filed April 9, 1962 9 Sheets-Sheet 8

ELDRED H. PAUFVE & JOHN M. HUNT

INVENTOR

BY Richard K. Stephens

ATTORNEY

ELDRED H. PAUFVE
JOHN N. HUNT
INVENTOR

BY Richard D. Stephens
ATTORNEY 3,172,046
Patented Mar. 2, 1965

3,172,046

SIGNAL FILTER SYSTEM

Eldred H. Paufve and John M. Hunt, Binghamton, N.Y., assignors to Link Division, General Precision, Inc., Binghamton, N.Y., a corporation of New York Filed Apr. 9, 1962, Ser. No. 186,077
21 Claims. (Cl. 328—166)

This invention relates to electronic signal processing apparatus, and more particularly to improved apparatus for processing phase-related electrical signals to improve their signal-to-noise ratio and provide improved output signals to utilization devices. The invention may be used in a wide variety of electronic applications, but is particularly useful in connection with apparatus which counts sequences of phase-related signals whose phase relationship indicates counting direction. Electronic apparatus which provides a pair of phase-related pulses or waves includes, for example, shaft position digitizers and interferometric measuring devices. U.S. Patent No. 2,977,841, issued April 4, 1961 to Kaufmann and Hayes illustrates an interferometric mensuration device in which two photo-detectors sense the occurrence of interference fringes as a movable measuring head is translated, providing output signals from the photo-detectors which have a phase relationship depending upon the direction of motion of the measuring head. Such interferometers are extremely useful for making measurements with great precision, since they are capable of measurements in terms of very small increments, fractions of a wavelength of light. To measure appreciable distances a large number of electronic pulses muct be counted, and thus pulse counting apparatus intended to be operated by such interferometers must be capable of counting at very high speeds if measurements are to be made rapidly, and in those systems which are reversible, the pulse counting apparatus must, of course, operate reliably at any speed between zero speed and maximum speed in either direction. While a variety of pulse counters have existed which were capable of counting at adequately high speeds, most of such counters have been unable to count photo-detector-derived signals reliably at high speeds due to the notoriously "noisy" output signals produced by photo-detectors. Thus interferometers of the prior art have been required to be operated at rather low speeds. While it heretofore has been suggested to connect low-pass filters to such noisy input signals to filter out high frequency noise, it will be seen that such filters also undesirably attenuate the high frequency information signals which necessarily occur during high-speed measurement, and thus limit system speed. The present invention, therefore, has as its main object, the provision of means for processing phase-related signals to provide output signals of greatly improved signal-to-noise ratio, so that pulse generating apparatus connected to be operated by such signals can be operated at high speed and over a wide range of speeds, and, of course, reversibly.

The invention may be effectively visualized either as an adjustable filter system which automatically and continuously adjusts its pass frequency to follow or track the input signal frequency changes so as to reject all frequencies outside a narrow band centered about the desired intelligence, or more accurately it may be regarded as a means which converts multiple phase-related noisy input signals to a single signal of standard or constant reference frequency for narrow-band filtering, and then uses the filtered signal to regenerate the original signals, but with most of the original noise components removed.

Thus it will be seen that it is a primary object of the present invention to provide improved means for filtering noise from multiple (but especially a pair of) phase-displaced signals having the same but a variable frequency while still maintaining the same phase-relationship between the signals, so that a reversible counter connected to be operated by the signals can be operated more reliably and at greatly increased speeds.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and object of the invention reference should be had to the following detailed description taken in connection with the accompanying drawings, in which:

FIG. 1 is a block diagram illustrating an exemplary embodiment of the invention;

FIG. 2*a* is a detailed electrical schematic diagram illustrating exemplary phase-inverters, a two-phase balanced modulator and a tuned amplifier which may be used in constructing the invention;

FIG. 2*b* is a waveform diagram useful in understanding operation of the two-phase balanced modulator;

Figure 5:
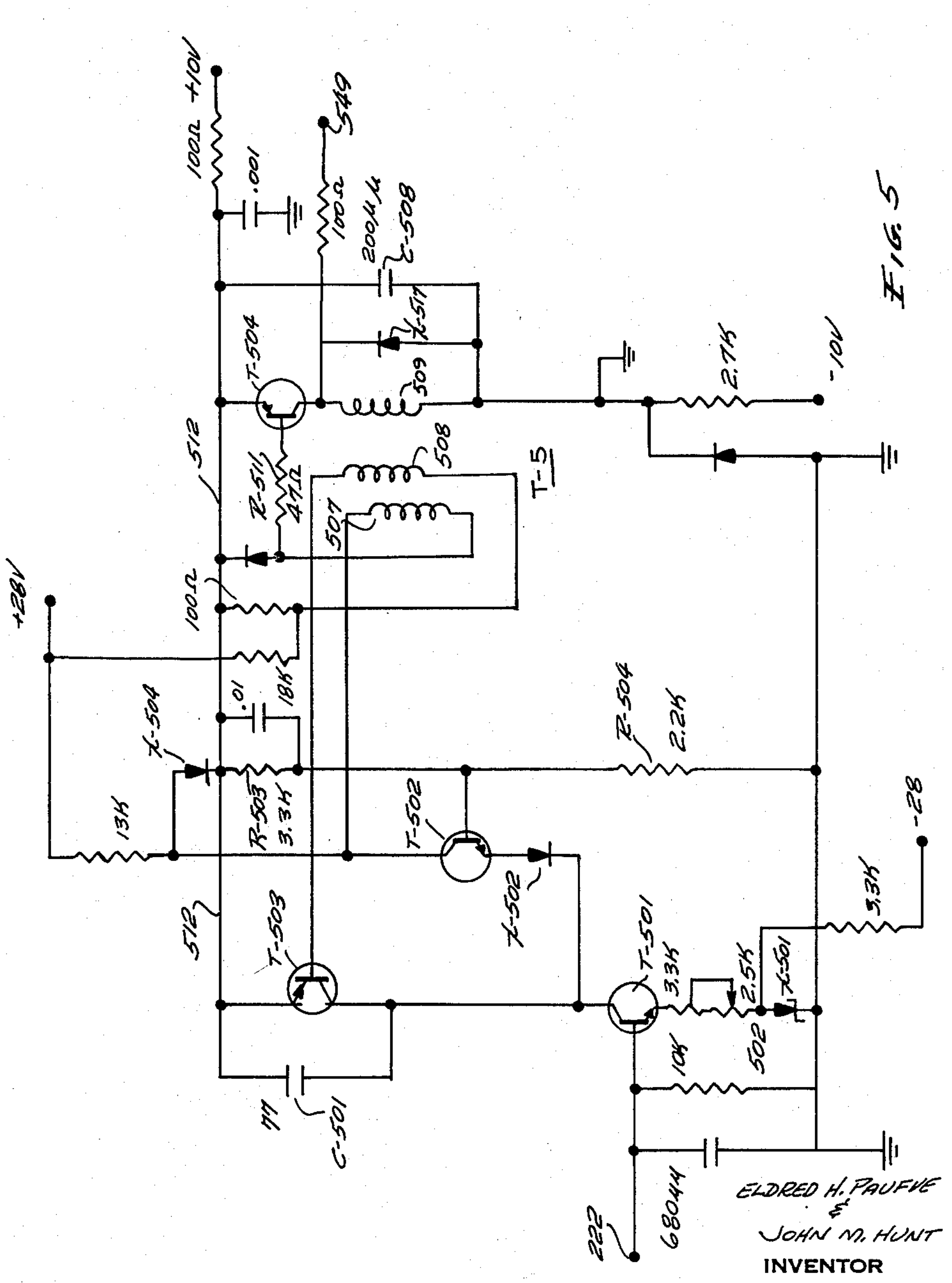
FIG. 5 is a detailed electrical schematic diagram illustrating an exemplary variable frequency pulse generator which may be used in practicing the invention.
Figure 6A:
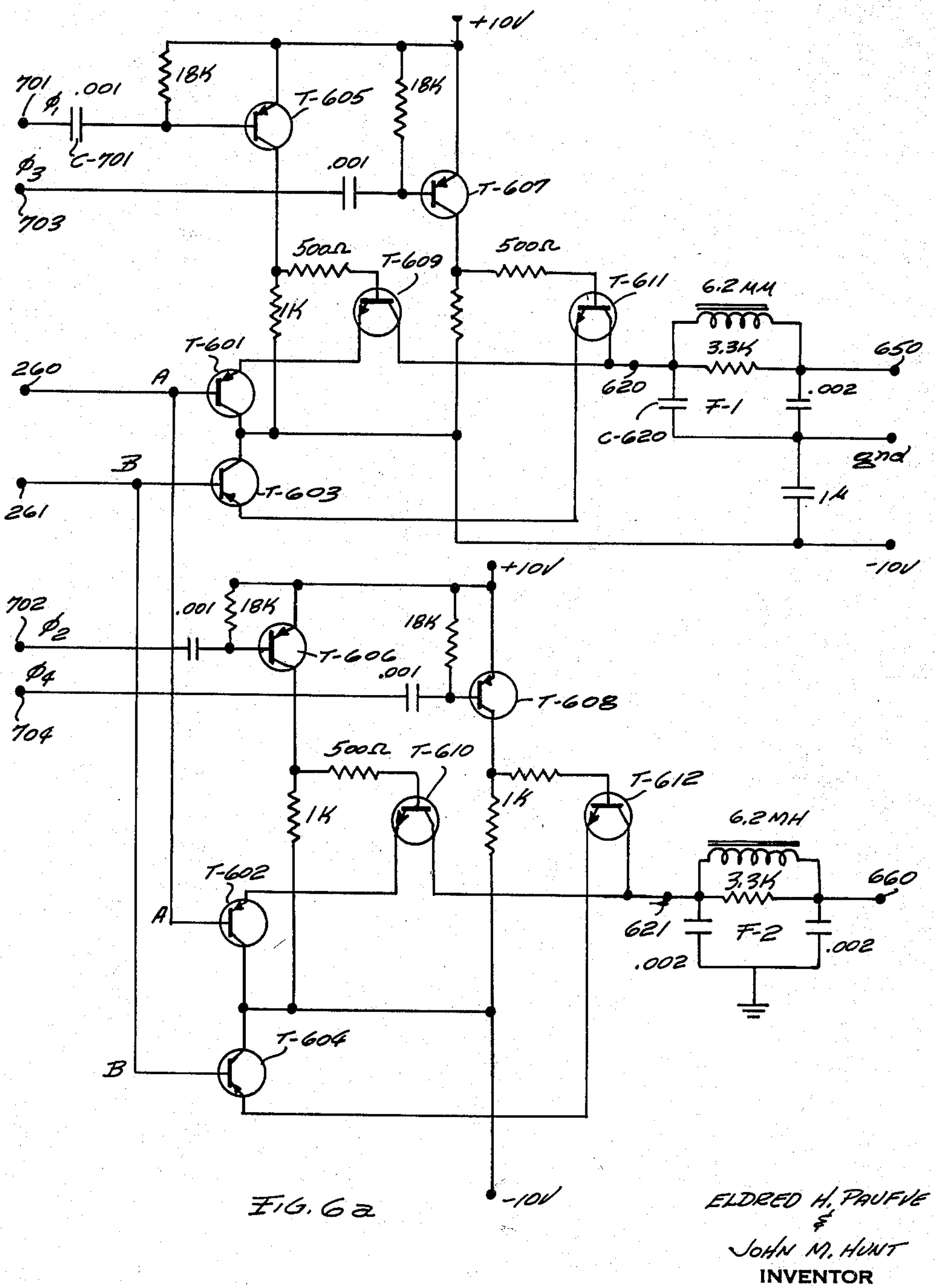
Figure 6B:
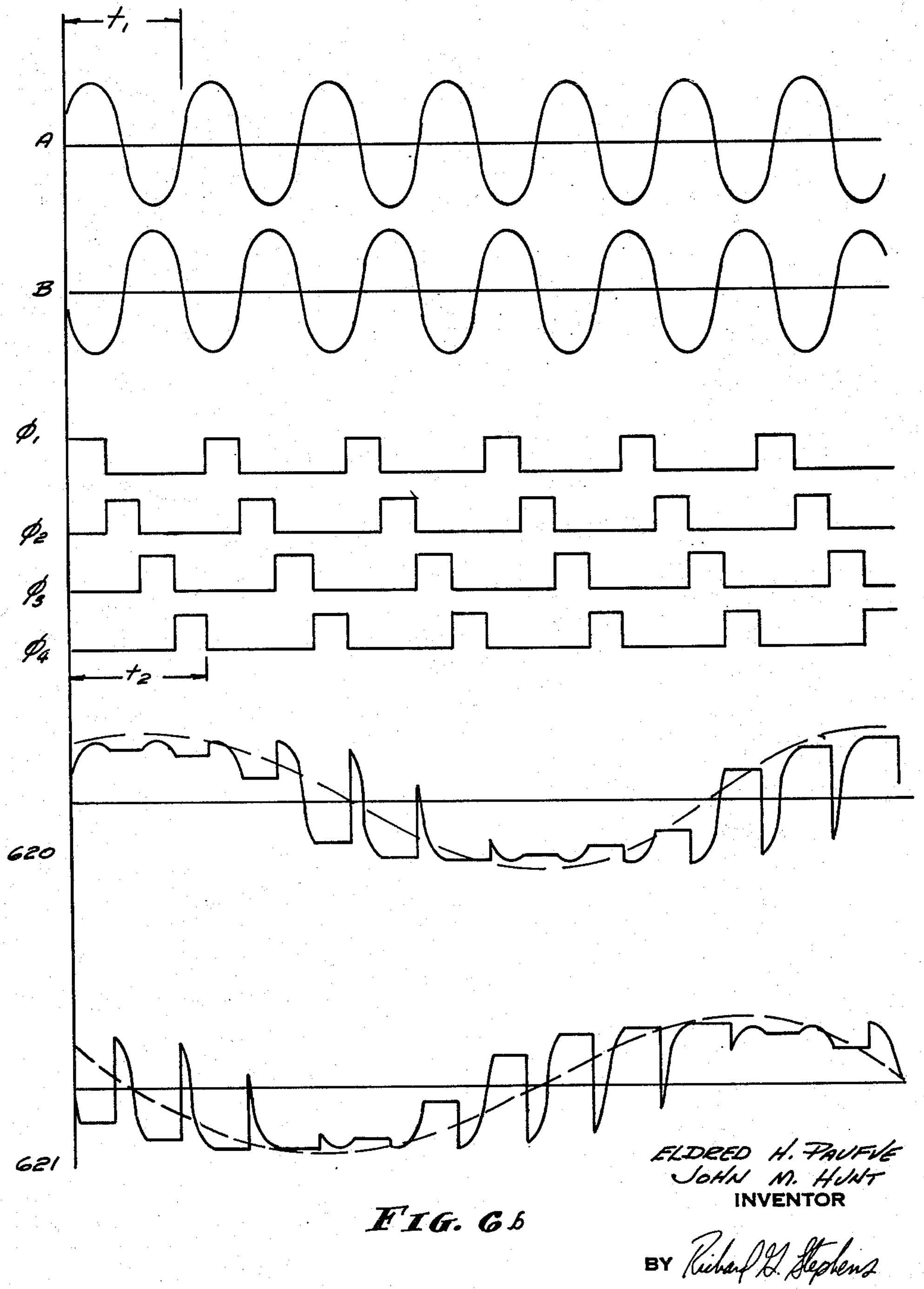
Figure 7B:
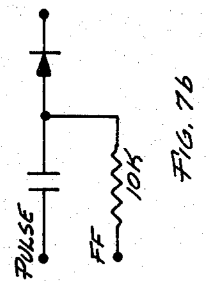
Figure 7A:
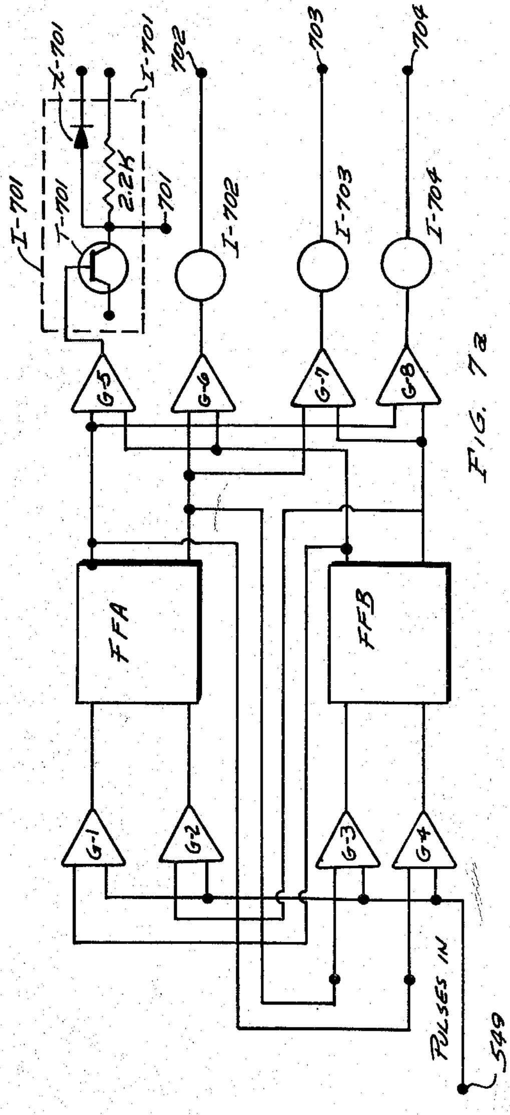
Figure 7D:
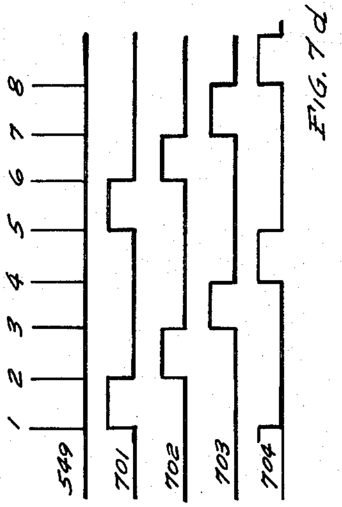
Figure 7C:
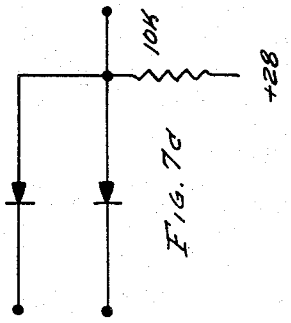
Figure 8:
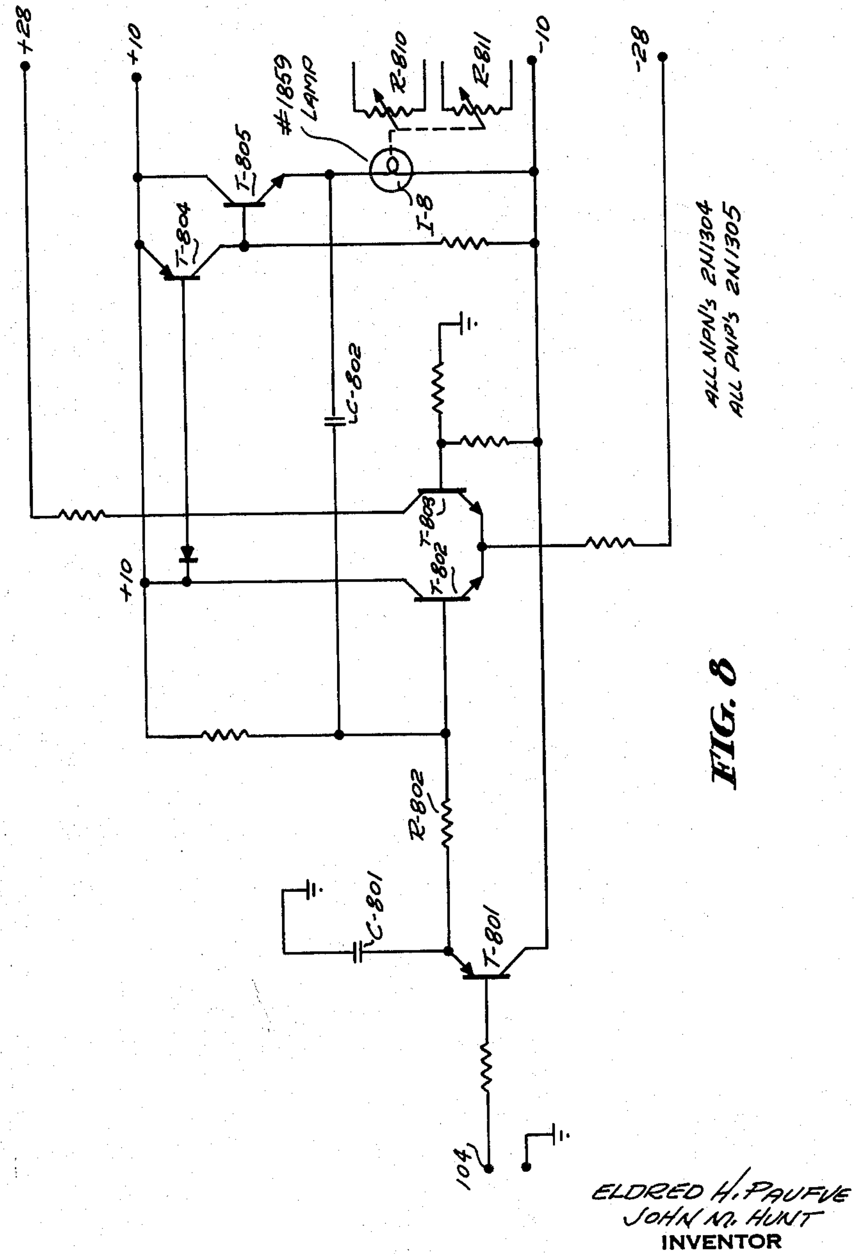

FIG. 6*a* is a detailed electrical schematic diagram illustrating an exemplary two-phase demodulator which may be used in constructing the invention;

FIG. 6*b* is a waveform diagram useful in understanding operation of the demodulator of FIG. 6*a*;

FIG. 7*a* is an electrical schematic diagram, partially in block form, illustrating exemplary frequency-dividing apparatus which may be used in conjunction with the apparatus of FIG. 5 to provide four-phase signals;

FIGS. 7*b* and 7*c* illustrate exemplary gate circuits which may be used in constructing portions of the apparatus of FIG. 7*a*;

FIG. 7*d* is a plot of waveforms useful in understanding the operation of the frequency-dividing apparatus of FIG. 7*a*; and FIG. 8 is an electrical schematic diagram illustrating exemplary gain control apparatus which may be used in conjunction with the invention.

Figure 1:
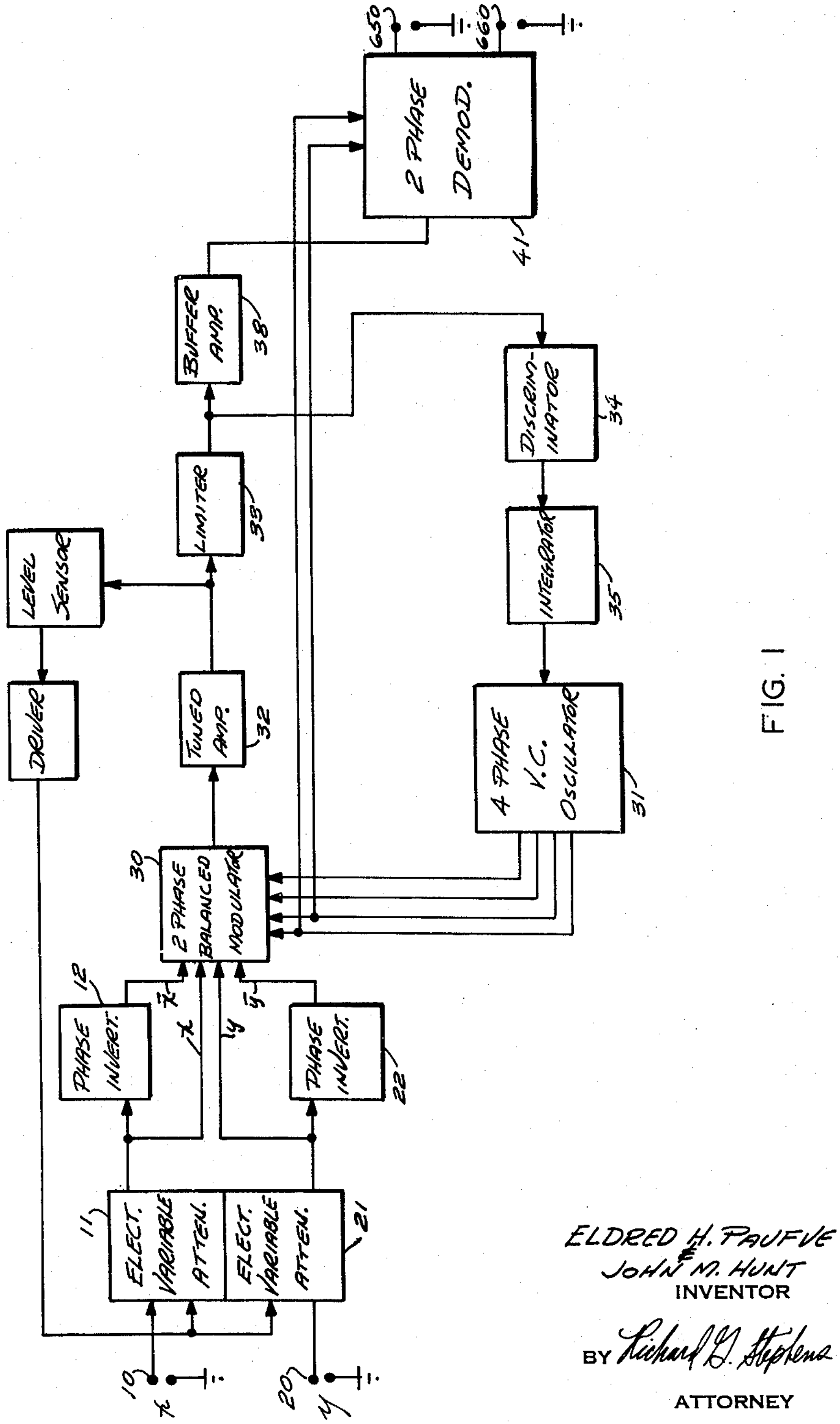

In FIG. 1 a pair of quadrature-related input signals x and y of frequency $f_{in}$ are applied at terminals 10 and 20, respectively, and then both directly and through respective phase inverters 12 and 22 to provide four input signals $x$, $\overline{x}$, $y$, and $\overline{y}$ to a two-phase balanced modulator device represented at 30. Modulator 30 is also fed four quadrature pulses from a voltage-controlled oscillator (31) of frequency $f_{osc}$. The 2 phase balanced modulator thereby produces a single modulation product frequency ($f_{osc}+f_{in}$) or ($f_{osc}-f_{in}$) depending upon the phase sequence of the input signals. The modulator 30 may also be considered as a multi-input sampling detector, but in effect, its operation is essentially that of a modulator and may be treated by application of the standard frequency mixing equations of the latter. When a carrier signal of frequency $f_c$ is modulated by signal of frequency $f_m$ in a modulator the output produced may be expressed as $$e=E_c \cos \omega_c t+kE_mE_c \cos (\omega_m t) \cos (\omega_c t) \quad (1)$$

or more conventionally, $$=E_c \cos \omega_c t \text{ (carrier component)}$$
$$+kE_mE_c \cos (\omega_c+\omega_m)t \text{ (upper sideband)}$$
$$+kE_mE_c \cos (\omega_c-\omega_m)t \text{ (lower sideband)}$$

In a balanced modulator the terms of Equation 1 are included twice; the first time as in Equation 1 and the second time with the signs of the carrier and modulation fractions reversed, as follows:

$$e=E_c \cos \omega_c t+kE_mE_c \cos \omega_m \cos \omega_c t$$
$$-E_c \cos \omega_c t+kE_mE_c \cos \omega_m \cos \omega_c t$$

which cancels out the carrier components and gives simply the upper and lower sidebands $$e=2kE_mE_c \cos (\omega_c+\omega_m)t \text{ (upper sideband)}$$
$$-2kE_mE_c \cos (\omega_c-\omega_m)t \text{ (lower sideband)}$$

In a two-phase modulator the similar modulation is of the quadrature input signals (which may be represented by replacing cosines by sines in the above equations) produces a total output from modulator 30 which may be expressed as follows:

$$e=E_c \cos \omega_c t+kE_mE_c \cos \omega_m t \cos \omega_c t$$
$$-E_c \cos \omega_c t+kE_mE_c \cos \omega_m t \cos \omega_c t$$
$$+E_c \sin \omega t+kE_mE_c \sin \omega_m t \sin \omega_c t$$
$$-E_c \sin \omega t+kE_mE_c \sin \omega_m t \sin \omega_c t$$
$$=2kE_mE_c (\cos \omega_m t \cos \omega_c t+\sin \omega_m t \sin \omega_c t)$$

which, through trigonometric manipulation may be reduced to a single sideband signal:

$$e=2kE_mE_c \cos (\omega_m-\omega_c)t \quad (2)$$

The choice of which sideband is present depends upon the phase of the quadrature signal relation to the reference phase (i.e., the sign of the sin $\omega_m$ terms in the above relation relative to the cos $\omega_m$ terms.)

The relationship presented above, resulting in only a single modulation product frequency is an important feature of the filter system, for it permits a single narrow bandwidth amplifier to be used (in conjunction with a frequency-controlled local oscillator) to pass a single signal which has in its phase relationship to the local oscillator signal, all the phase and frequency information present in the two quadrature-related input signals.

The intermediate frequency I.F. output signal from modulator 30 is applied to a tuned amplifier 32 (tuned to a predetermined frequency, such as 180 kilocycles, for example) to eliminate all noise outside a narrow band about the intelligence signal. The amplitude of the modulation product signal (I.F. signal) will be seen from Equation 2 to be constant regardless of the frequency or phase of the input modulating signals. The entire information content is carried in its phase relationship. The output from fixed frequency amplifier 32 is applied to a clipper, or amplitude limiter stage 33, which contributes significantly to signal noise ratio by removing amplitude noise. The output signal from limiter 33 is applied to frequency discriminator 34, which is designed with the same center frequency as tuned amplifier 32 (180 kc. in the example given). Discriminator 34 provides an output voltage of a polarity which depends upon whether the signal applied to discriminator 34 is higher or lower in frequency than the discriminator center frequency. The output voltage from discriminator 34 is integrated by integrator 35 to provide a frequency control voltage for oscillator 31 and to provide exact centering of the signal in the I.F. pass band regardless of the input frequency. The circuit of FIG. 1 thus will be seen to be connected in a closed loop. If the input signals vary in frequency, the modulation product signal received by discriminator 34 also will tend to vary in frequency, providing an output from discriminator 34 of such polarity as to alter the local oscillator frequency signal from variable-frequency voltage-controlled oscillator 31 in a direction to reduce the frequency shift, thereby maintaining the modulator 30 output signal at the tuned amplifier and discriminator center frequency. Because considerable gain may be provided within the feedback loop shown, and because all of the components in the loop are electronic, it will be recognized that the frequency response of the system easily may be made very high, so that variations in input signal frequency will be followed easily. It will be seen that even though the pair of quadrature input signals vary widely in frequency, from zero up to say 50 kc., oscillator 31 will change frequency so as to locate the selected sideband output modulator 30 at 180 kc., the center frequency of discriminator 34. Because tuned amplifier 32 may be tuned sharply to such center frequency, it will be seen that all noise components outside the pass-band of amplifier 32 will be greatly attenuated and that the information signal may be considerably amplified. Thus the output signals from tuned amplifier 32 have a greatly improved signal-to-noise ratio, and limiter 33 is used to even further improve the ratio.

It will be seen in the example given, wherein the tuned amplifier and discriminator are centered at 180 kc., that if the input signals vary between zero and 30 kc., that oscillator 31 frequency $f_{osc}$ will vary between 180–210 kc. or if the phase relationship of the input is reversed $f_{osc}$ will vary between 180 and 150 kc. Thus the phase sequence and the frequency of the input signals will serve to vary the oscillator frequency upward or downward uniquely in response to the input signals.

While the apparatus thus far described will be seen to greatly improve the signal-to-noise ratio of the signal at the output of limiter 33, it will be seen that it also has been undesirably (from a counting standpoint) shifted in frequency, so that a counter connected to such signals would erroneously count at 180 kc. rate when the actual input signal frequency were zero. To reconstitute "clean" input signals of proper frequency for counting, the output signal from limiter 33 is applied, via buffer amplifier 38 to a two-phase demodulator 41 or "phase detector" of the sampling detector, which is also supplied with the four quadrature-related reference voltages from oscillator 31. By using alternate pairs of these voltages to sample the signal from limiter 33 independently, demodulator 41 transforms its single I.F. frequency signal into two signals, quadrature-related at the original input signal frequency, thereby providing a pair of output signals from demodulator 41 which have the same frequency and phase relationship as the original signals, and which are thus suitable for operating a reversible counter. Because the demodulator 41 reference signals are generated locally by oscillator 31, they are substantially noise-free in the frequency range of interest, and hence demodulation does not re-introduce significant noise. The output signals from demodulator 41 may be applied to operate a variety of utilization devices, such as the reversible counters shown in Pat. No. 2,833,476 assigned to the same assignee as the present invention.

FIG. 1 also shows gain control apparatus auxiliary to the invention which may be used for sensing the level of the output signals from the amplifier 32 and for controlling the magnitude of the input signals applied to modulator 30, to prevent any limiting effects occurring in modulator 30 over a wide range of input signal amplitudes, and thus preserve a constant phase relationship between input and output signals and thereby provide accurate phase relationships at the output of the filter system. The auxiliary apparatus is explained in detail in connection with FIG. 8.

Figure 2A:
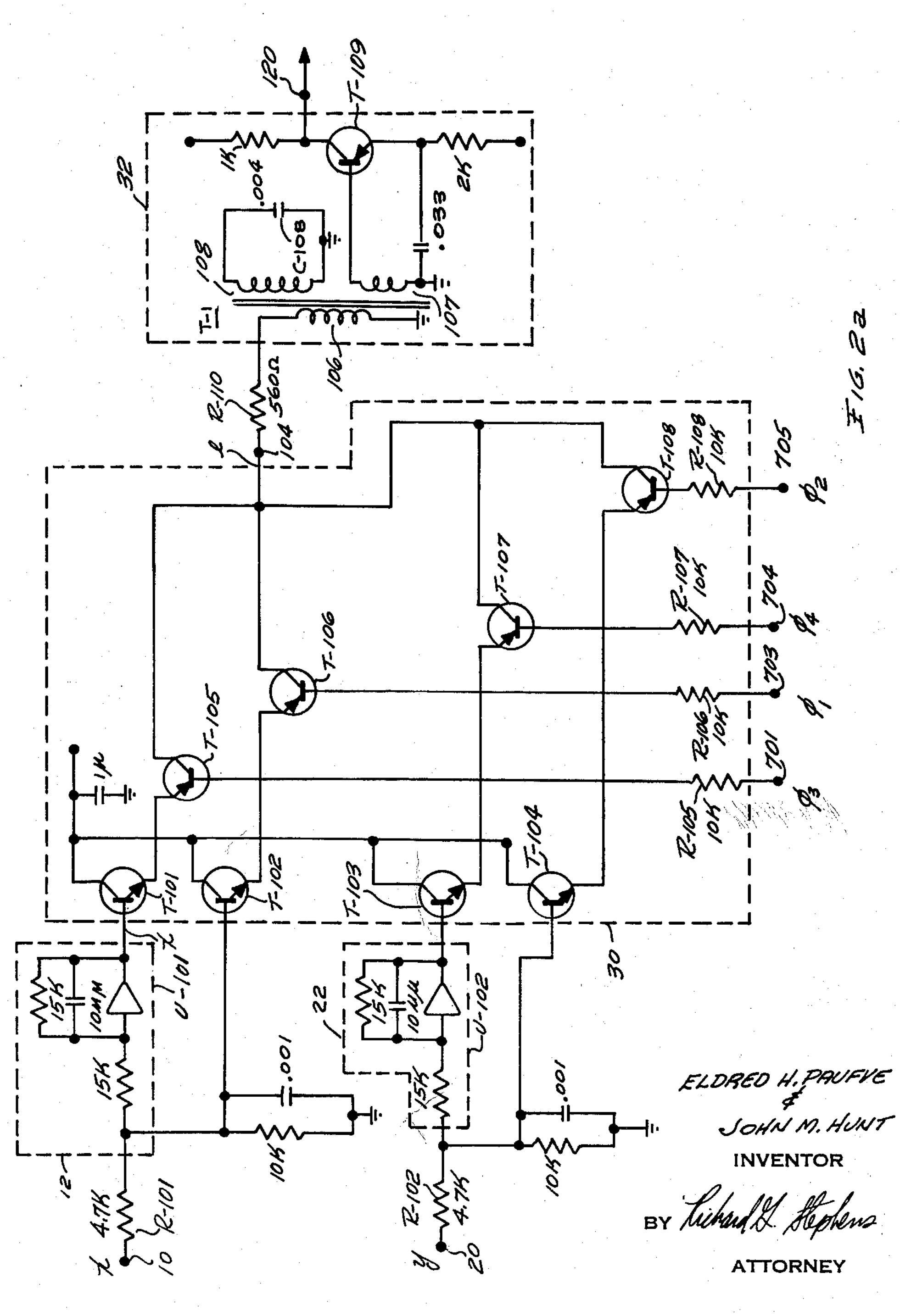
Figure 2B:
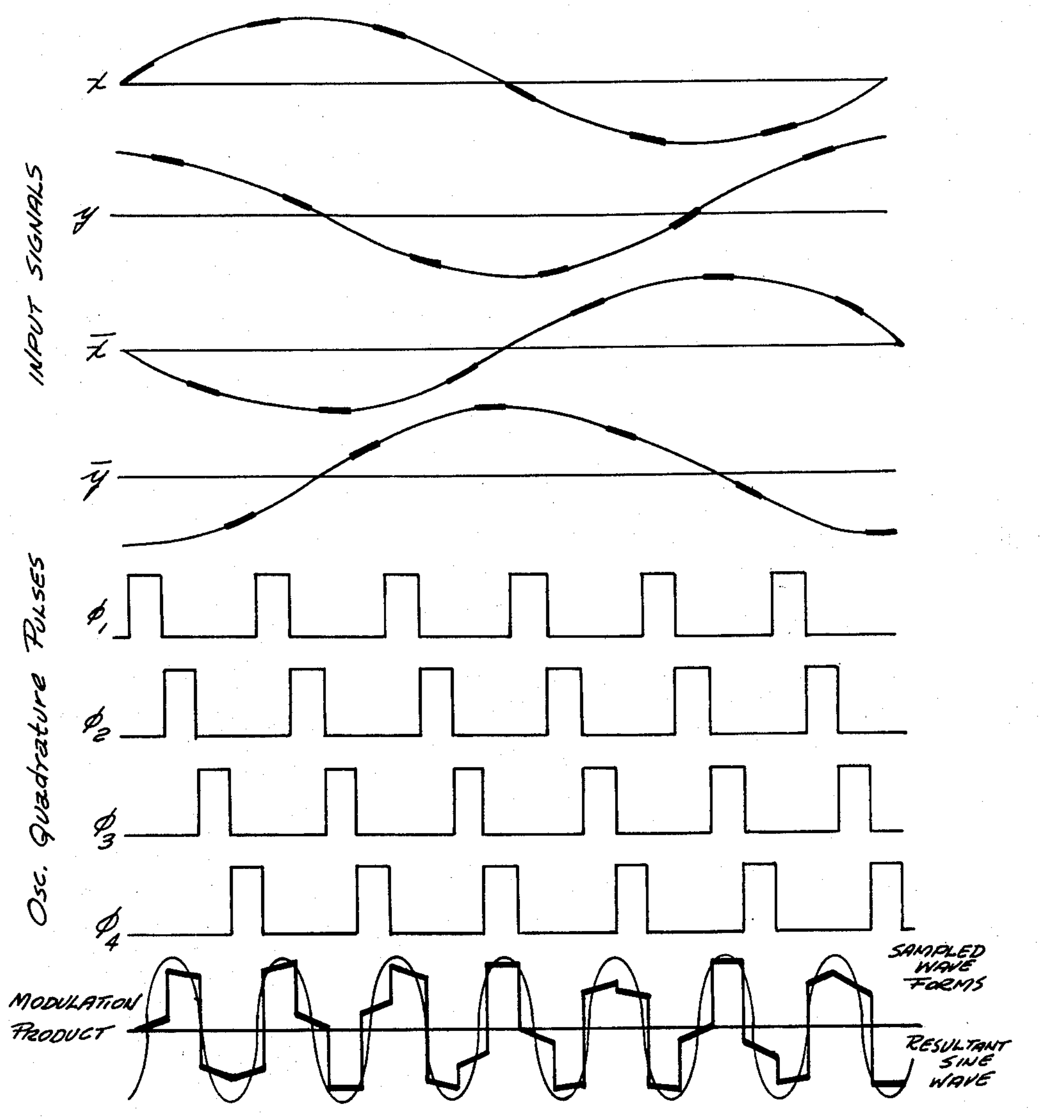

In FIG. 2*a* the *x* and *y* input signals are shown applied from input terminals 10 and 20, respectively, both directly and through respective unity-gain inverting amplifiers U–101 and U–102 to the base electrodes of four NPN transistors T–101 to T–104 of the two-phase balanced modulator shown in detail within dashed lines at 30. The collector electrodes of the four transistors are connected to a positive supply potential, and the emitters of the four transistors are connected respectively to the emitters of four PNP transistors T–105 through T–108. The base electrodes of transistors T–105 to T–108 are supplied individually with respective phases of the four-phase output signal from variable frequency oscillator 31, via respective resistors R–105 through R–108. The collector electrodes of transistors T–105 to T–108 are interconnected to provide the modulator output terminal 104 with the sampled waveform as shown at the bottom of FIGURE 2*b*. The four signals applied to modulator 30 via resistors R–105 to R–108 are labeled $\phi_1$, $\phi_2$, $\phi_3$ and $\phi_4$, and they are 90 degrees phase-displaced from each other, as follows:

$$\phi_1 = E_c \left| \begin{matrix} \dfrac{\pi}{2\omega_c} + \dfrac{2n\pi}{\omega_c} \\ t = 0 + 2n\pi/\omega_c \end{matrix} \right.$$

$$\phi_2 = E_c \left| \begin{matrix} \pi/\omega_c + 2n\pi/\omega_c \\ \pi/2\omega_c + 2n\pi/\omega_c \end{matrix} \right.$$

$$\phi_3 = E_c \left| \begin{matrix} 3\pi/2\omega_c + 2n\pi/\omega_c \\ \pi/\omega_c + 2n\pi/\omega_c \end{matrix} \right.$$

$$\phi_4 = E_c \left| \begin{matrix} 2\pi/\omega_c + 2n\pi/\omega_c \\ 3\pi/2\omega + 2n\pi/\omega_c \end{matrix} \right.$$

The $x$, $\overline{x}'$, $y$ and $\overline{y}'$, input signals may be defined as follows:

$$x = E_m \sin \omega_m t$$

$$\overline{x}' = -E_m \sin \omega_m t$$

$$y = E_m \cos \omega_m t$$

$$\overline{y}' = -E_m \cos \omega_m t$$

As mentioned above, modulator 30 will provide an output signal $e$ having a suppressed carrier component ($2j\omega_c M a_1 E_c \cos \omega_c t$), and likewise a suppressed upper or lower sideband, $2j\omega_c M a_2 E_c E_m \cos(\omega_c + \omega_m)t$ or $$2j\omega_c M A_2 E_c E_m \cos(\omega_c - \omega_m)t$$

thus leaving only one of these, a single sum or difference frequency output.

FIG. 2*b* illustrates the operation of modulator 30. One cycle each of the pair of quadrature input signals $x$ and $y$, and of the inverted signals $\overline{x}$ and $\overline{y}$, all are shown in FIG. 2*b*, with six cycles of the oscillator 31 output signals occurring during the same period. The portions of each of the $x$, $\overline{x}$, $y$ and $\overline{y}$ signals which are sampled are shown in heavier lines. During the occurrence of phase $\phi_1$ pulses, transistor T–106 samples the $x$ signal, applying it to terminal 104, the output terminal of modulator 30. During the occurrence of phase $\phi_2$ pulses, transistor T–108 applies the $y$ signal to terminal 104, transistor T–105 sampling the $\overline{x}$ signal during the $\phi_3$ period and transistor T–107 sampling the $\overline{y}$ signal during the $\phi_4$ period, thereby providing the resultant output signal shown in solid lines at terminal 104. The signal at 104 will be seen from the seven cycles of sine wave superimposed therein to have a fundamental frequency equal to the sum of the input signal frequency (1 cycle) and the oscillator signal frequency (six cycles), together with certain high frequency modulation products resulting from the sampling process, but without components of either the original input frequency or the oscillator frequency present in the output signal at terminal 104. Thus if the input signals ($x$, $\overline{x}$, $y$ $\overline{y}$) have a frequency of 25,714 2/7 c.p.s., and the oscillator output signals have a frequency six times higher, i.e., 154,285 5/7 c.p.s., the fundamental frequency of the output signal at terminal 104 will be their sum frequency, i.e., 180 kc.

The modulator output signal is applied via resistance R–110 to the tuned amplifier shown in FIG. 2*a* within dashed lines at 32. The signal is shown connected to primary winding 106 of transformer T–1, which has a tuned secondary, shown as comprising inductance 108 and capacitor C–108, tuned to be parallel-resonant at the selected center frequency (180 kc., in the example given), and to present a low shunting impedance to all other frequencies. A third output winding 107 connects the signal induced therein between base and emitter of a conventional grounded-emitter amplifier transistor T–109. The output signal taken at terminal 120 from the collector electrode of transistor T–109 thus will contain only a narrow band of frequencies about the selected center frequency and will attenuate noise present at other portions of the spectrum.

Figures 3, 4:
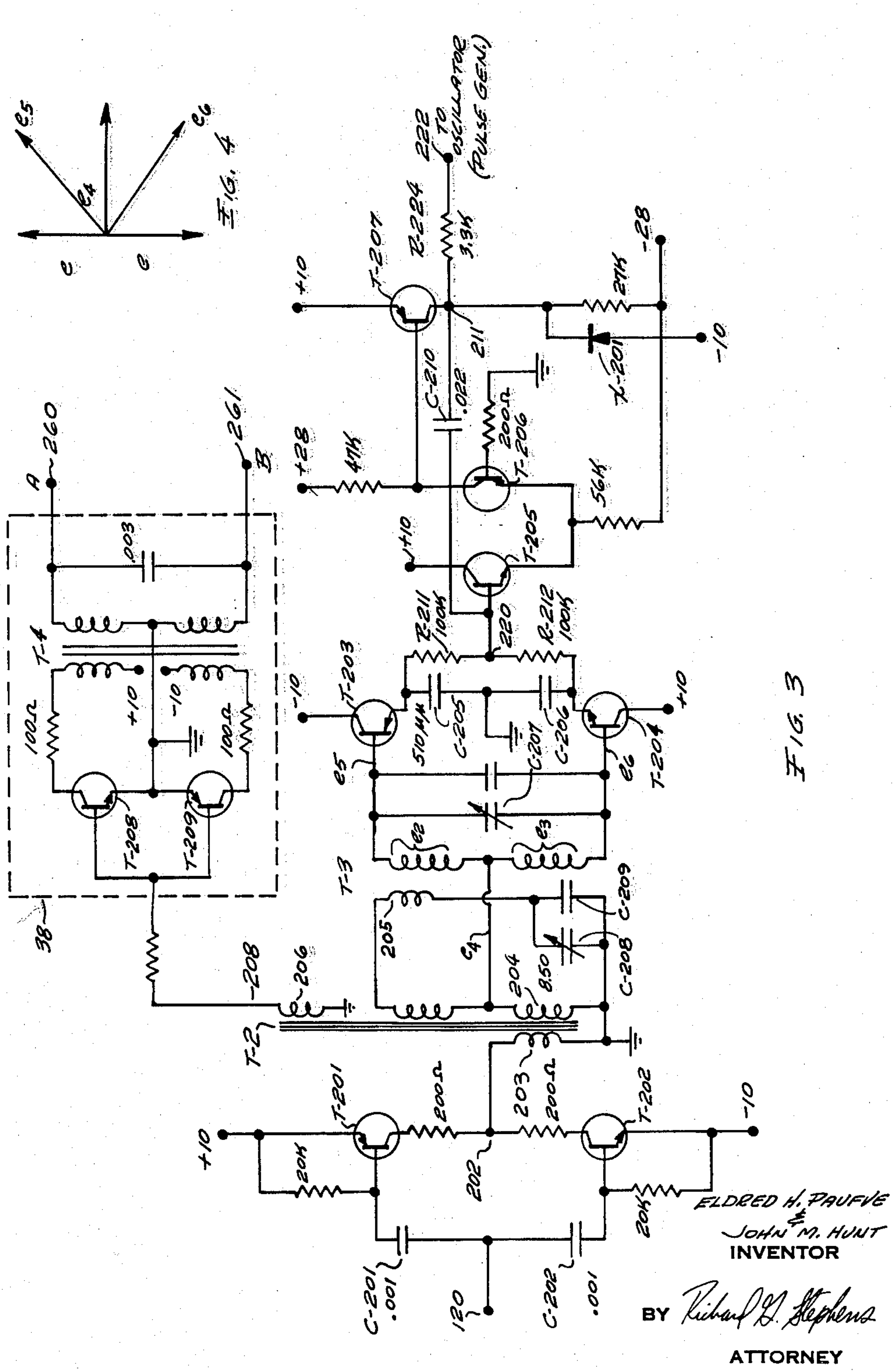
FIG. 3 is a detailed electrical schematic diagram illustrating exemplary limiter circuits, a frequency discriminator, an integrator and an amplifier which may be used in practicing the invention.
FIG. 4 is a vector diagram useful in understanding the operation of the frequency discriminator of FIG. 3.

The signal at terminal 120 is applied via coupling capacitors C–201 and C–202, as shown in FIG. 3, to a pair of complementary grounded-emitter limiter transistors T–201 and T–202, each of which are designed to amplify only the peaks of the signal from tuned amplifier 32, thus maintaining a fairly constant output regardless of the input signal amplitude at 120. The output signal at terminal 202 is applied to primary winding 203 of tuned transformer T–2, which comprises one portion of a relatively unusual discriminator transformer configuration tuned at the selected center frequency. Secondary winding 206 of transformer T–2 connects in a conventional manner an output signal from transformer T–2 via line 208 for a purpose to be described below.

Transformers T–2 and T–3, together, are designed to function as a single discriminator transformer. The relative unavailability of commercial discriminator transformers at the desired center frequency in the specific embodiment described, and the relative difficulty in designing an air-core transformer of suitable size and Q and mutual inductance led to the invention of the composite transformer configuration shown, which uses two interconnected high Q toroidal transformers. It should be understood that a variety of known frequency discriminator circuits may be substituted without departing from the invention.

Circulating current in the tuned secondary winding 204 of transformer T–2 is connected to induce a voltage in the windings of transformer T–3 through the primary winding 205. Because of the phase relationships in T–3 produced through the resonance of the secondary winding 206 with capacitors 207, the voltage present across winding 206 at the center of the pass band is in quadrature with the voltage across winding 204 of transformer T–2.

The frequency discriminator circuit comprising T–2, T–3, complementary transistors T–203 and T–204, capacitors C–205, C–206 and resistors R–211 and R–212 is operated as a ratio detector. The center frequency of the discriminator secondary is determined by adjustment of capacitor C–207. The voltages $e_2$ and $e_3$ induced in the upper and lower halves of the T–3 secondary winding are 180 degrees out-of-phase with each other. Both of these voltages are connected to ground through a portion of winding 204, so that voltage $e_4$ across winding 205 is therefore added to the voltages $e_2$, $e_3$, induced in each half of the T–3 secondary winding. The primary circuit capacitance C–208, C–209 is adjusted with respect to the inductance of coil 205 to tune the primary circuit to resonance at the center frequency, so that the $e_4$ voltage is 90° out-of-phase with the current in coil 205, and because the $e_4$ voltage is 90 degrees out-of-phase with both $e_2$ and $e_3$, the vector resultant voltage $e_5$ applied to the base of transistor T–203 has the same magnitude as the resultant voltage $e_6$ applied to transistor T–204, as shown in FIG. 4. For input frequencies other than resonance, however, the $e_4$ voltage will be other than in phase quadrature with voltages $e_2$ and $e_3$, effectively swinging vector $e_4$ so that resultant voltage $e_5$ will be increased and resultant voltage $e_6$ decreased, or vice versa. Thus the difference between the voltages at the emitters of transistors T–203 and T–204 acting as peak detectors will vary as the input frequency to the discriminator circuit varies, providing a direct voltage at terminal 220 having a magnitude and polarity dependent upon the excursion and direction of the input frequency with respect to the selected center frequency. Capacitors C–205 and C–206 serve to filter the high frequency components out of the direct voltage.

The voltage at terminal 220 is integrated with respect to time by an electronic integrator comprising transistors T–205, T–206, T–207 and feedback capacitor C–210. Diode X–201 serves to clamp the integrator output voltage to prevent it from going more negative than −10 v. The output voltage from terminal 211 of the integrator is connected via resistance R–224 and terminal 222 to the input circuit of variable frequency pulse-generating means 31 shown in detail in FIG. 5.

The voltage on conductor 208 from the output of the limiter stages is applied to operate a conventional push-pull buffer amplifier stage 38 comprising transistors T–208, T–209 and tuned transformer T–4. The output signals at terminals 260 and 261 of transformer T–4 are connected to the two-phase demodulator 41 shown in detail in FIG. 6.

In FIG. 5 the input voltage at terminal 222 will be seen to set the emitter voltage of T–501 so that a known voltage will exist between that emitter and terminal 502, which voltage is maintained precisely constant by xener diode X–501 and the divider resistor from a negative supply. The known and electronically variable voltage across the emitter resistors will hold the emitter current and thus the collector current of T–501 at a known but variable level. This collector current will be seen to be applied to capacitor C–501, and being a constant current source to capacitor C–501, will cause the T-501 collector voltage to move linearly with time in a negative direction, beginning at the collector supply potential (+10 volts) and decreasing toward ground potential. As mentioned above, the value of the constant current through transistor T–501, and hence the rate at which the collector voltage decreases is determined by the control potential applied via terminal 222 to the base of transistor T–501. This linear, negative-going collector voltage is applied via diode X–502 to the emitter of transistor T–502, the base of which is supplied with a constant reference voltage (approximately +4 volts) from a voltage divider formed by resistors R–503 and R–504. As the T–501 collector voltage falls from +10 volts but remains above +4 volts, diode X–502 and the emitter-base junction of transistor T–502 will be back-biased, leaving the T–502 collector voltage clamped to +10 volts by diode X–504. However, as the T–501 collector potential reaches and begins to decrease below +4 volts, current will immediately begin to flow in transistor T–502, attempting to produce an abrupt decrease in the transistor T–502 collector voltage. The T–502 collector voltage is connected via winding 507 of transformer T–5 and resistor R–511 to the base of T–504, so that as the T–502 collector voltage tries to drop below +10 volts, current flows in the base-emitter junction of T–504, turning the transistor on. The sudden advent of collector current in T–504 produces a voltage drop in winding 509 which is coupled back to the base via winding 507 regeneratively, thus generating a pulse in typical blocking oscillator fashion. This pulse is also coupled to T–503 effectively shorting it and discharging C–501, after which another charging cycle begins. Capacitor C–508 is charged from the −10 v. supply and is used as an energy supply for the pulse, and diode X–517 is used as a damper diode to prevent the tuned circuit from "ringing." Because the control voltage applied at terminal 222 controls the magnitude of the charging current of C–501, it will be seen that it controls the period of each cycle, and hence the repetition frequency of the pulse signal from transformer T–5 and transistor T–504. With zero voltage on control terminal 222, the circuit of FIG. 5 has a frequency, or repetition rate, of 720 kc., and, as the input voltage is made to vary between +2 volts and −2 volts, the repetition rate will vary between 840 kc., and 600 kc.

Because four quadrature pulses are required from the oscillator or pulse-generating means, the circuit is operated at four times the desired output frequency, and the four quadrature pulses are provided by frequency division, by a factor of four, by means shown in FIG. 7*a* as comprising eight "and" gates (G–1 through G–8) and two bi-stable flip-flops FFA and FFB. As shown in FIG. 7*a* flip-flops FFA and FFB are connected in an alternate dividing arrangement, and as four successive input pulses are applied via input line 549, the two flip-flops will be switched alternately through their four possible combinations of stable states. Each of "and" gates G–5 through G–8 will indicate the occurrence of a different one of the four states, and apply an output voltage through a respective inverter amplifier (of the group I–701 to I–704) to an output terminal. Thus as successive input pulses are applied on line 549, as shown in FIG. 7*d*, the voltages on output lines 701–704 will change as shown in FIG. 7*d*. FIG. 7*b* shows an exemplary form for "and" gates G–1 to G–4, and FIG. 7*c* shows an exemplary form for "and" gates G–5 through G–8. Both types of "and" gates are well-known i nthe art and need not be explained in detail.

The output lines 701–704 of FIG. 7*a* are connected as shown in FIG. 2 to operate modulator 30, and also connected as shown in FIG. 6 to provide interrogate or reference pulses for two-phase demodulator 41. The sinusoidal output voltage A and its inverse B from buffer amplifier 38 (FIG. 3) are connected via terminals 260, 261 to demodulator 41. The A voltage is applied to the bases of transistors T–601 and T–602 and the inverse of this voltage (labeled the B voltage) applied to the bases of transistors T–603 and T–604. Phase $\phi_1$ of the pulse generator output is connected via terminal 701 and coupling capacitor C–701 to the base of transistor T–605, which is normally biased off by the stored charge in C–701, and the occurrence of a negative pulse at terminal 701 will turn on transistor T–605, driving its collector positive. This will cause the base of T–609 to move positively until it reaches the lesser voltage of the base (emitter) of T–601 or of C–620. At this time transistor action of T–609 either in the normal or reverse fashion will cause current to flow so as to raise or lower the voltage on C–620 such that it equals the base (emitter) voltage on T–601. The other three phases of the pulse generator output are connected similarly to control transistors T–606, T–607 and T–608 and to produce positive pulses at their collectors upon receipt of negative-going base input pulses. The collectors of transistors T–605 to 608 are connected to the base electrodes of respective NPN transistors T–609 to T–612, and therefore the oscillator 31 four-phase input pulse to demodulator 41 serve to sequentially sample the signal input A or its inverse B.

The voltages on the two lines, 620, 621, will have the original quadrature relationship of the original $x$ and $y$ input voltages. These are applied to respective low-pass filters F–1 and F2, which have low-frequency pass bands adapted to attenuate all companents beyond the range of the original modulating signals. The output voltages on terminals 650 and 660 will then constitute a pair of quadrature-related voltages phased in accordance with counting direction and they may be used to drive a conventional counter (not shown) adapted to be operated by such signals.

In FIG. 6*b* seven cycles of signals A and B at the selected center frequency are shown with a period $t_1$, and during the same time there will occur six cycles of the oscillator output signals, which have period $t_2$ which is 7/6 greater than $t_1$. Such a relationship would prevail, for example, if the selected center or I.F. frequency were 180 kc. and the oscillator frequency were 6/7 of 180 kc., or 154.28 kc. Transistor T–609 samples the A voltage during the $\phi_1$ pulse, and transistor T–611 samples the B voltages during the $\phi_3$ pulse, providing pulses on line 620 of the nature shown in FIG. 6*b*. Similarly, the transistor T–610 samples the A voltage during the $\phi_2$ pulse, and transistor T–612 samples the B voltage during the $\phi_4$ pulse, providing pulses on line 621 of the nature shown in FIG. 6*b*. The voltages on lines 620 and 621 each will be seen from the sine waves shown in dashed lines to have a fundamental frequency commensurate with the difference between the two frequencies applied to the demodulator, (or 45 kc. in the example given) plus various higher frequency components, all of which may be filtered out easily. It is important to note that the phase angle between the two fundamentals is ninety degrees, the same as between the original *x* and *y* input signals, and the phase sequence is the same.

The level-sensor and control circuit shown in detail in FIG. 8 monitors the amplitude of the output signal from balanced modulator 30. If the modulator output signal increases above a reference level the circuit provides power to operate electrically-controlled attenuator means 11, 21 to increase the resistance of the attenuators to tend to maintain the modulator output signal amplitude constant. In FIG. 8 the modulator 30 output signal is shown connected via terminal 104 to a peak detector circuit including transistor T–801 and capacitor C–801, which provides an output signal via resistor R–802 to transistor T–802 of a voltage-comparator shown as comprising a conventional long-tail pair comparator comprised of transistors T–802 and T–803, the latter transistor being biased with a constant reference voltage input. The comparator output voltage from the collector of transistor T–803 is amplified by transistor T–804 and coupled by means of an emitter follower T-805 to drive a miniature lamp I–8. The emitter follower output is also fed back to the comparator input circuit via feedback capacitor C–802, which serves to integrate or average out any rapid fluctuations if such occur in the peak detector output signal. Lamp I–8 is physically mounted to provide light to photo-resistors R–810 and R–811 and thereby vary the resistances of the photoresistors. Photoresistor R–810 is connected to terminal 10 to control the magnitude of the *x* input signal, and photoresistor R–811 is connected to terminal 20 to control the magnitude of the *y* input signal. If desired, various alternative automatic gain control circuits may be substituted without departing from the invention. For example, lamp I–8 may be replaced by a resistance heating element physically placed to vary the resistances of thermistors which may be substituted for the photoresistors shown.

While the specific embodiment described is a two-phase arrangement for use with a pair of quadrature-related input signals, it will now be apparent to those skilled in the art that the invention may as well be utilized in a three-phase arrangement to handle three 120 degree related input signals, providing an additional phase inverter for the third input signal, by modifying modulator 30 with an additional channel for the third input signal and its inverse signal, and by changing oscillator 31 to provide a six phase rather than a four phase output, and by enlarging demodulator 41 to provide a three phase output. Such modifications may be easily accomplished by those skilled in the art without further detailed explantion being necessary. It will also be apparent to those skilled in the art that the invention may be modified to receive a three-phase input and produce a two-phase output, or vice versa, to receive a two-phase input and produce a three-phase output. For example, in the embodiment shown, if demodulator 41 is made three-phase and oscillator 31 modified to produce a six-phase output as well as its four-phase output, application of the six-phase oscillator output signals to demodulator 41 will provide three-phase output signals from two-phase input signals, with proper phase sequence (direction) operation preserved in the output signals. Also, it will be apparent that other polyphase systems may be constructed without departing from the invention.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawing shall be interpreted as illustrative and not in a limiting sense.

Having described our invention, what we claim as new and desire to secure by Letters Patent is:

1. Reversible pulse-counting apparatus, comprising, in combination: means for providing a pair of phase-displaced input signals on a pair of separate respective input lines, said pair of signals having the same variable frequency and a varying mutual phase-relationship which is indicative of direction; modulator means responsive to each of said input signals and to a plurality of oscillator output signals for modulating said signals to provide a single sideband signal; frequency-selective amplifier means tuned to a predetermined frequency and connected to amplify said single sideband signal to provide a second signal of said predetermined frequency; frequency discriminator means tuned to said predetermined frequency and connected to said second signal to provide a control signal which varies in sense as said second signal tends to vary above or below said predetermined frequency; variable frequency pulse-generating means controlled by said control signal and operative to provide said oscillator output signals; a two-phase demodulator means connected to said second signal and to said plurality of oscillator output signals for providing a second pair of phase-displaced signals having the same variable frequency and phase relationship as said pair of input signals; and a reversible electronic counter connected to be operated by said second pair of phase-displaced signals.

2. Apparatus according to claim 1 in which said input signals comprise a pair of quadrature-phased signals capable of varying between zero frequency and a predetermined maximum frequency, and in which said oscillator output signals comprise four signals spaced at ninety degrees from each other.

3. Apparatus according to claim 1 in which said modulator means comprises a two-phase balanced modulator operative to eliminate components of the frequencies of said input signals and said oscillator output signals from said single sideband signal.

4. Apparatus according to claim 1 having amplitude-limiter means connected to said second signal to slip amplitude noise from said second signal.

5. Apparatus according to claim 1 having means for sensing the amplitude of said second signal and for providing a second control voltage commensurate therewith, and a pair of variable-gain control means connected respectively to said pair of input signals, said second control voltage being connected to control the amplitudes of said input signals, thereby to decrease changes in the modulation index of said modulator as the amplitudes of said input signals vary.

6. Apparatus according to claim 1 in which said control voltage is connected to increase the frequency of said oscillator output signals as said input signals increase in frequency, and in which said frequency-selective amplifier means is tuned to amplify the lower sideband component of the combination of said input signals and said oscillator output signals.

7. Apparatus according to claim 1 in which said control voltage is connected to decrease the frequency of said oscillator output signals as said input signals increase in frequency, and in which said frequency-selective amplifier means is tuned to amplify the upper sideband component of the combination of said input signals and said oscillator output signals.

8. Apparatus according to claim 1 in which said variable frequency pulse-generating means comprises means for generating an intermediate oscillator signal, and frequency-dividing means responsive to said intermediate oscillator signal for providing said plurality of oscillator output signals.

9. Apparatus according to claim 1 in which said frequency discriminator means includes pulse-integrating means.

10. Apparatus according to claim 1 in which said modulator means includes a pair of signal-inverting means operative to provide third and fourth input signals to said modulator, and four gating means, each of said input signals and a respective oscillator output signal being connected to a respective one of said gating means, the output signals from each of said gating means being connected together to provide said sideband signal.

11. Apparatus according to claim 1 in which said frequency-selective amplifier means includes a parallel-resonant LC circuit resonant at said predetermined frequency.

12. Apparatus according to claim 1 having signal-inverting means connected to provide said second signal to said demodulator as two signals of opposite instantaneous polarity.

13. A signal filter system for filtering a pair of phase-displaced variable frequency input signals having a phase sequence indicative of direction, comprising, in combination: a two-phase balanced modulator; a variable-frequency oscillator for providing a plurality of phased oscillator output signals; said modulator being connected to said input signals and said oscillator output signals and operative to sample said input signals to provide a single sideband signal having a phase relationship with respect to said oscillator output signals indicative of said phase sequence of said input signals; frequency-selective amplifier means tuned to a predetermined frequency and connected to amplify said sideband signal to provide a second signal; frequency discriminator means responsive to said second signal and operative to provide a control signal, said control signal being connected to control said variable-frequency oscillator to tend to maintain the frequency of said sideband signal constant at said predetermined frequency as the frequency of said input signals varies; and a two-phase demodulator responsive to said second signal and said phased oscillator output signals, said demodulator being operative to sample said second signal at intervals determined by said phased oscillator output signals, thereby to provide first and second output signals having the same frequency and phase relationship as said input signals.

14. An electronic signal filtering apparatus, comprising, in combination: means connected to receive a plurality of phase-displaced input signals having a variable frequency and a varying phase sequence indicative of direction; modulator means responsive to each of said input signals and to a plurality of oscillator output signals for modulating said signals to provide from said plurality of phase-displaced input signals a unique sideband signal; frequency-selective amplifier means tuned to a predetermined frequency to amplify said sideband signal to provide a second signal; frequency discriminator means tuned to said predetermined frequency and responsive to said second signal to provide a control signal which varies in accordance with variation of the frequency of said second signal with respect to said predetermined frequency; variable frequency pulse-generating means controlled by said control signal and operative to provide said plurality of oscillator output signals; and demodulator means responsive to said second signal and to said plurality of oscillator output signals for providing a further plurality of phase-displaced signals having the same variable frequency and phase sequence as said phase-displaced input signals.

15. Apparatus according to claim 14 in which said plurality of phase-displaced input signals comprise a pair of quadrature-phased input signals.

16. Apparatus according to claim 14 in which said plurality of phase-displaced input signals comprise three 120 degree phased input signals.

17. Apparatus according to claim 14 having a amplitude limiter means connected to clip amplitude noise from said second signal.

18. A signal filter system comprising, first and second phase-related input signals; circuit means coupled to said first and second signals operative to provide third and fourth signals, said third signal being the inverse of said first signal and said fourth signal being the inverse of said second signal; a voltage-controlled oscillator having a frequency determined by the frequency of said first and second signals for providing four quadrature pulse signals; a two-phase multi-input sampling detector; means coupling said first, second, third, and fourth signals and the output pulses provided by said oscillator to said sampling detector to provide only a single sideband signal wherein the phase relationship between said first and second input signals is retained in the phase relationship between said sideband signal and said oscillator output.

19. A signal filter system comprising, a number of phase-related input signals having a variable frequency and varying phase relationship indicative of information; a N-phase modulator including a plurality of input terminals and a single output terminal, wherein N equals the number of said input signals; a multi-phase oscillator providing 2N phase-related output signals; means coupling all of said number of phase-related input signals and said 2N phase-related oscillator output signals to said plurality of input terminals; and said N-phase modulator providing a single modulation product frequency at said output terminal.

20. The system of claim 19 further including a N-phase demodulator having a plurality of input terminals and N output terminals; means individually coupling said single modulation product frequency and said 2N phase-related oscillator output signals to said plurality of input terminals of said N-phase demodulator; and said N-phase demodulator providing N output signals having the same frequency and phase relationship as said number of phase-related input signals.

21. The system of claim 19 wherein said 2N phase-related oscillator output signals are equally angularly displaced one to another.

References Cited by the Examiner

UNITED STATES PATENTS

| | | | |
|---|---|---|---|
| 2,501,368 | 3/50 | White | 325—148 |
| 2,808,508 | 10/57 | Sinninger | 328—166 X |
| 3,054,062 | 9/62 | Vonarburg | 328—133 |
| 3,084,328 | 4/63 | Groeneveld et al. | 325—49 |

JOHN W. HUCKERT, *Primary Examiner.*

ARTHUR GAUSS, *Examiner.*